(12) United States Patent
Leenknegt

(10) Patent No.: US 6,816,445 B2
(45) Date of Patent: Nov. 9, 2004

(54) DEVICE AND METHOD

(75) Inventor: George Alois Leonie Leenknegt, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 703 days.

(21) Appl. No.: 09/832,722

(22) Filed: Apr. 11, 2001

(65) Prior Publication Data

US 2001/0030921 A1 Oct. 18, 2001

(30) Foreign Application Priority Data

Apr. 14, 2000 (EP) ............................................. 00201353

(51) Int. Cl.$^7$ ................................................. G11B 7/00
(52) U.S. Cl. .............................. 369/47.25; 369/124.1; 369/44.35
(58) Field of Search .......................... 369/47.1, 47.15, 369/47.25, 53.1, 59.1, 59.15, 124.01, 124.1, 124.12, 44.27, 44.28, 44.29, 44.35, 44.36, 44.41

(56) References Cited

U.S. PATENT DOCUMENTS 5,113,387 A * 5/1992 Goldsmith et al. ...... 369/44.38
5,703,848 A    12/1997 Hofer ...................... 369/44.29
5,710,748 A     1/1998 Hofer ...................... 369/44.35
6,157,601 A *  12/2000 Kao et al. ................ 369/44.35
6,400,664 B1 *  6/2002 Shimano et al. ......... 369/44.37

FOREIGN PATENT DOCUMENTS

EP    0821356 A2   7/1997
EP     821356 A2   1/1998

* cited by examiner

Primary Examiner—Muhammad Edun
(74) Attorney, Agent, or Firm—Michael E. Belk

(57) ABSTRACT

A device in accordance with the invention for recording or reproducing information onto/from a rotating information carrier (10) has rotating element (16) for rotating the information carrier. The device further has conversion (16) for converting a write signal ($S_W$) into a detectable pattern on the information carrier, or for generating a read signal ($S_{LS}$) in response to a detectable pattern on the information carrier. The device also includes control unit (25, 26) for supplying at least one control signal ($S_R$, $S_F$) to the conversion unit in response to an error signal (RE, FE). The device also includes detection unit (25A, 26A) for generating a detection signal ($D_R$, $D_F$) which is a measure of a periodic variation in the error signal (RE, FE). The device in accordance with the invention is characterized by adjustment unit (29) for influencing the response of the control unit (25, 26) to the error signal (RE, FE) in dependence on the detection signal ($D_R$, $D_F$).

14 Claims, 7 Drawing Sheets

DEVICE AND METHOD

The invention relates to a device for recording and/or reproducing information on/from a rotary information carrier, including
- means for rotating the information carrier,
- conversion means for the conversion of a write signal into a detectable pattern on the information carrier, or for generating a read signal in response to a detectable pattern on the information carrier,
- control means for supplying at least one control signal to the conversion means in response to an error signal,
- detection means for the generation of a detection signal which is a measure of a periodic variation in the error signal.

The invention further relates to a method of recording and/or reproducing information on/from a rotary information carrier, comprising the steps of
- rotating the information carrier,
- converting a write signal into a detectable pattern on the information carrier, or generating a read signal in response to a detectable pattern on the information carrier,
- generating an error signal which is related to a parameter which influences the conversion,
- generating a control signal for optimizing the parameter in response to the error signal,
- generating a detection signal which is a measure of a periodic variation in the error signal.

A rotary information carrier is, for example, a disc-shaped optical information carrier such as a CD, a DVD or a DVR, a magnetic information carrier or a magneto-optical information carrier.

Rotary information carriers may exhibit various errors which complicate reading of and writing on such information carriers. In the case of an error of a first type (skew), shown diagrammatically in FIG. 1A, the normal to the surface of the information carrier 1 is not parallel to its axis of rotation 2 but deviates therefrom by an angle $\alpha$. During rotation of the information carrier the surface thereof moves up and down with an amplitude h. This means that a continual adjustment of an axial setting of the conversion means is necessary, for example an axial setting of a focusing element in an optical read/write head, in order to follow this periodic excursion.

Figure 1A:
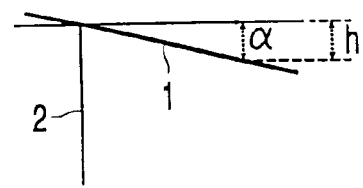
Figure 1B:
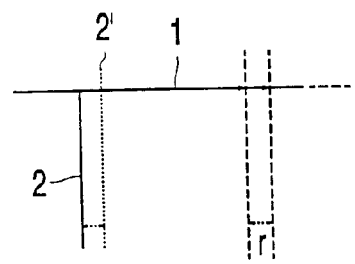

An error of a second type, shown diagrammatically in FIG. 1B, is eccentricity. In this case, the axis of rotation 2 of the information carrier 1 does not coincide with a point 2' about which the tracks of the information carrier are centered. In this case the conversion means should perform a periodic radial movement of an amplitude r in order to enable a track to be followed.

Figure 1C:
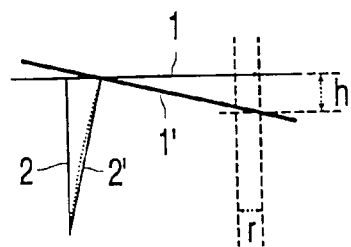

When the information carrier exhibits an error of a third type, shown diagrammatically in FIG. 1C, the mass of the information carrier is not distributed symmetrically about the axis of rotation 2. In this case a rotation of the information carrier 1 results in the information carrier surface being moved periodically in a radial direction with an amplitude r as well as in a vertical direction with an amplitude h. This requires a continual adjustment of the conversion means in these two directions.

EP 821 356 A2 describes a method of operating a device for reading CD-ROM information carriers. Said device detects whether the disc placed on the device exhibits an eccentricity or unbalance. This detection is effected on the basis of the radial error signal or a control signal for the motor for the rotation of the information carrier. If this detection shows that the information carrier exhibits an eccentricity or unbalance the speed of rotation of the information carrier is reduced. However, a drawback of this method is that a reduction of the speed of rotation also results in a reduction of the speed of reading and/or writing.

It is an object of the invention to provide a device of the type defined in the opening paragraph, which offers an alternative to the reduction of the speed of rotation.

It is a further object of the invention to provide a method of the type defined in the second paragraph, which offers an alternative to the reduction of the speed of rotation.

To this end, according to the invention, the device of the type defined in the opening paragraph is characterized by means for influencing the response of the control means to the error signal in dependence on the detection signal.

According to the invention the method of the type defined in the second paragraph is characterized by the response to the error signal being influenced in dependence on the detection signal.

By influencing the response (of the control means) to the error signal it is possible to raise the reliability with which the conversion means read a signal from the information carrier or write said signal to the information carrier. The invention is of particular interest for a device for reading of and/or writing onto optical information carriers. In such a device the conversion means usually take the form of a read/write head including a radiation source, means form imaging radiation generated by the radiation source so as to form a scanning spot on the information carrier, and means for imaging radiation reflected from the information carrier onto detection means. Such a read/write head usually has a first actuator for the axial tracking of the information carrier and a second actuator for the radial tracking of the information carrier.

An embodiment of the device in accordance with the invention is characterized in that the error signal is a radial error signal. With the aid of this error signal it is possible to determine whether the information carrier exhibits an eccentricity.

A further embodiment of the device in accordance with the invention is characterized in that the error signal is a focus error signal. With the aid of this error signal it is possible to determine whether the information carrier exhibits skew.

The response can be influenced in different manners, depending on the nature of the error of the information carrier.

An embodiment is characterized in that the adjustment means influence a bandwidth of the control means. An increase of the bandwidth is particularly favorable in the case of an information carrier which exhibits an unbalance. In this case, the radial and the axial error exhibit not only a disturbance at a fundamental frequency which corresponds to the frequency of rotation of the information carrier but also disturbances at higher harmonics of this frequency.

A further embodiment is characterized in that the control means include a PID controller and the adjustment means influence one or more gain factors of the PID controller. In the case of an eccentric information carrier it is favorable, for example, to increase the integrator frequency.

An embodiment of the device in accordance with the invention is characterized in that the device further includes detection means for the generation of a further detection signal which is a measure of the influence of the angular velocity with which the information carrier is rotated on the detection signal, the device having the adjustment means also in order to influence the response of the control means to the error signal in dependence on the further detection signal. The influence of the speed of rotation on the detection signal is an indication of the degree of unbalance of the information carrier. The influence of the speed of rotation on the detection signal becomes greater as the unbalance of the information carrier is greater.

In an embodiment of the device in accordance with the invention the detection means include a filter and a peak detector. The filter transmits the disturbance components which are relevant to the information carrier error to be detected. The peak detector forms a practical method of deriving the detection signal from the filtered signal. Alternatively, it is possible to use a detector which detects the means square value of the signal.

Preferably, the filter is a digital band-pass filter whose sample frequency is locked to the angular velocity of the information carrier. The transmission of the error signal component to be detected is then substantially independent of the angular velocity at which the measurement is effected.

It is not adequate in all cases to influence the response of the control means to the error signal in dependence on the detection signal. A favorable embodiment of the device in accordance with the invention is characterized in that, as an additional measure, the adjustment means further influence the speed of rotation of the information carrier in response to the detection signal. In this embodiment the speed of rotation is reduced, for example, if the detection signal, or the further detection signal derived therefrom, exceeds a predetermined value.

Figure 2:
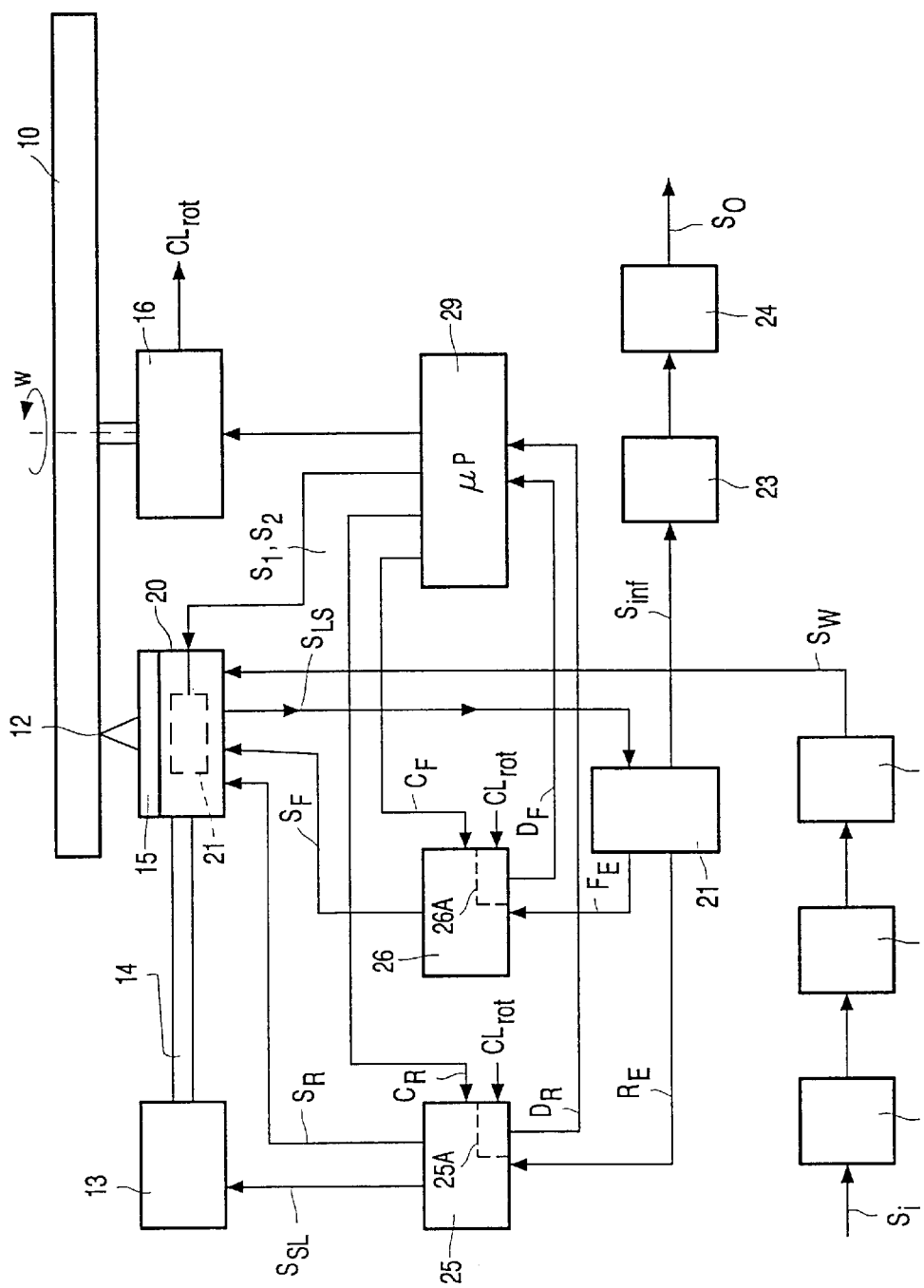
Figure 3:
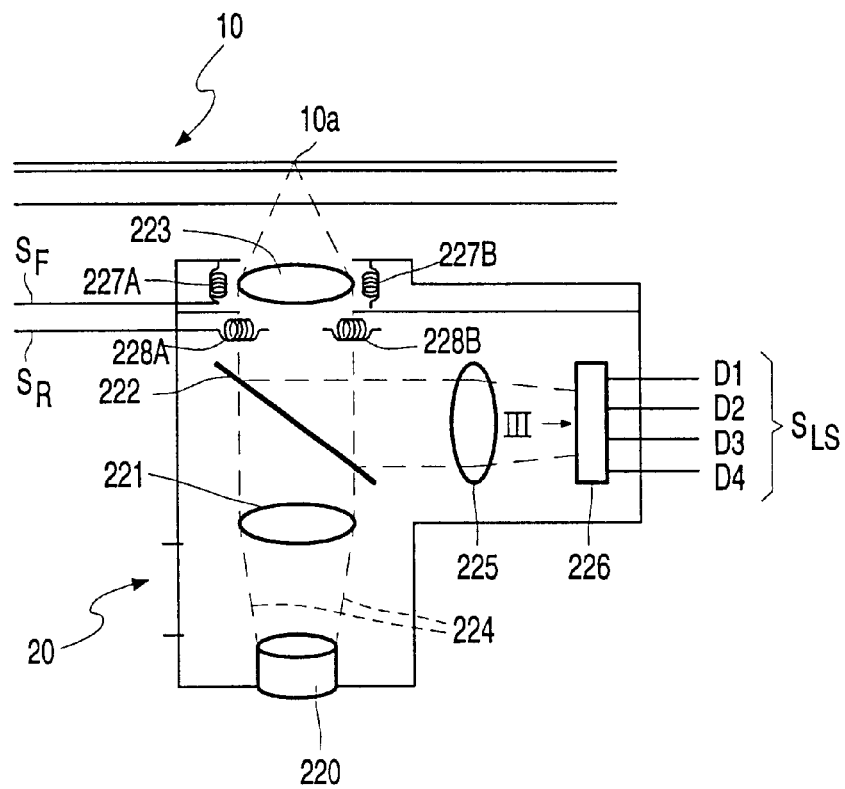
Figure 4:
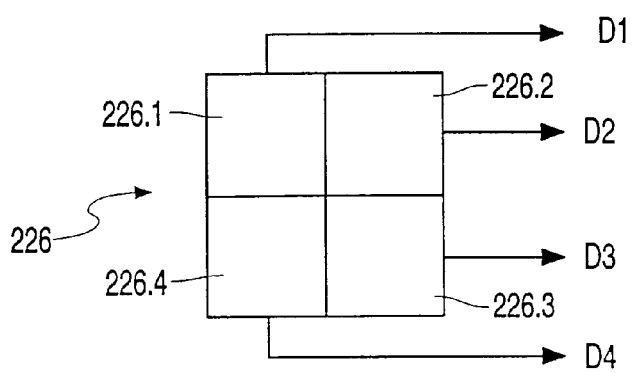
Figure 5:
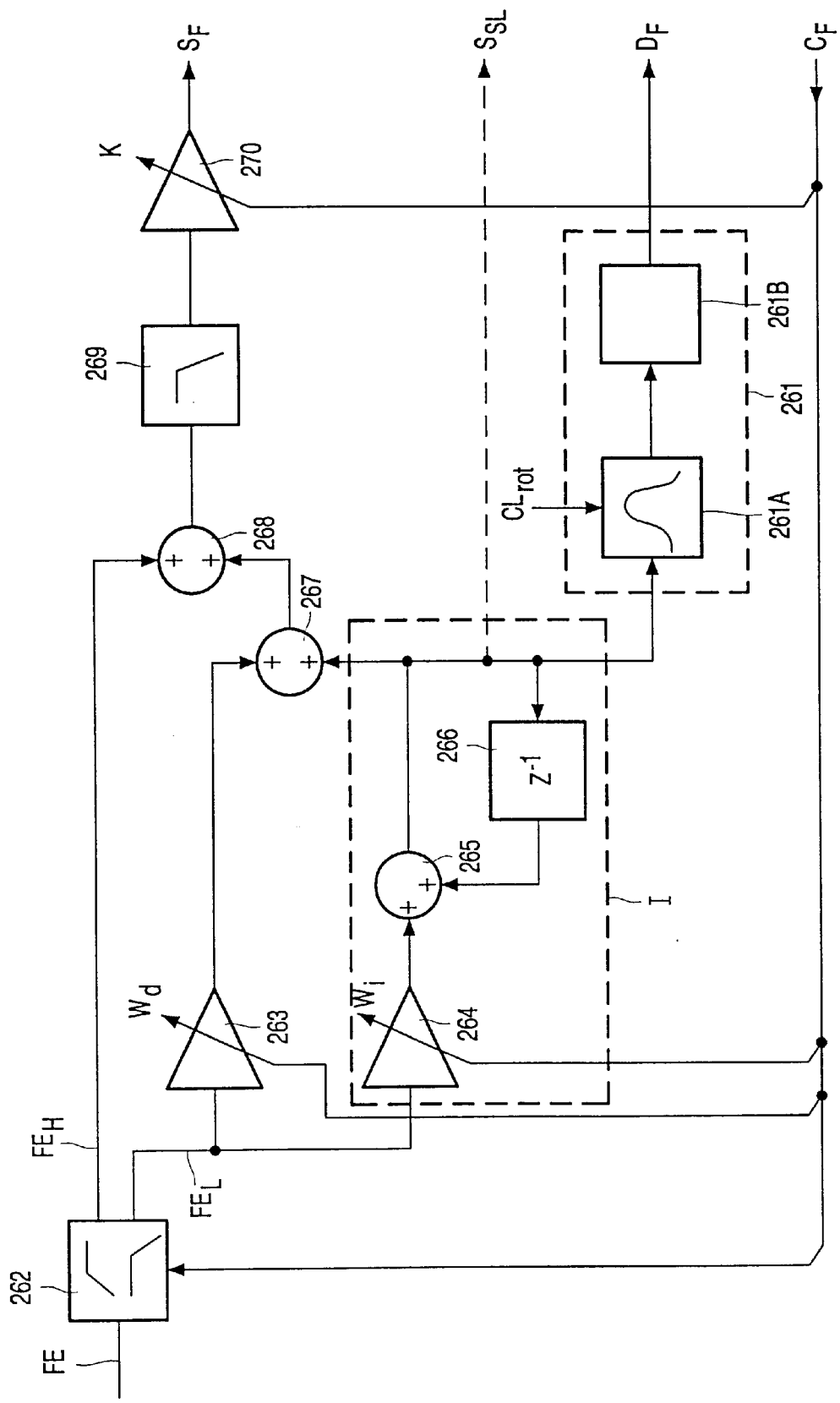
Figure 6:
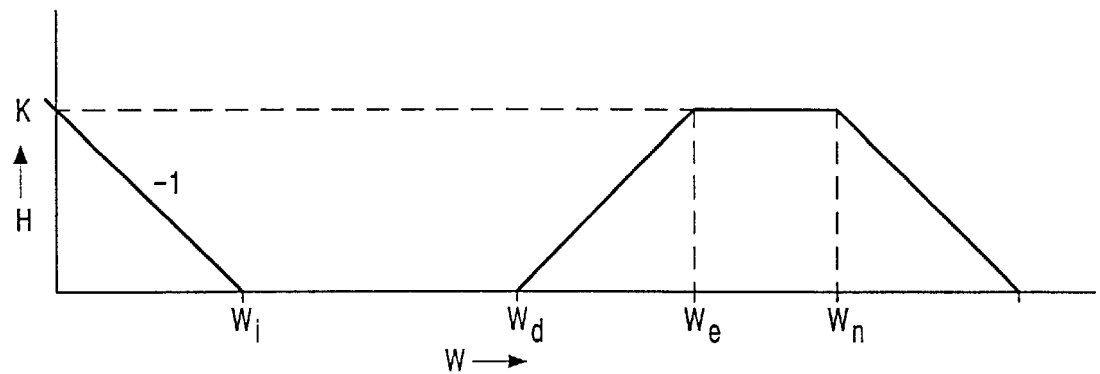
Figure 7:
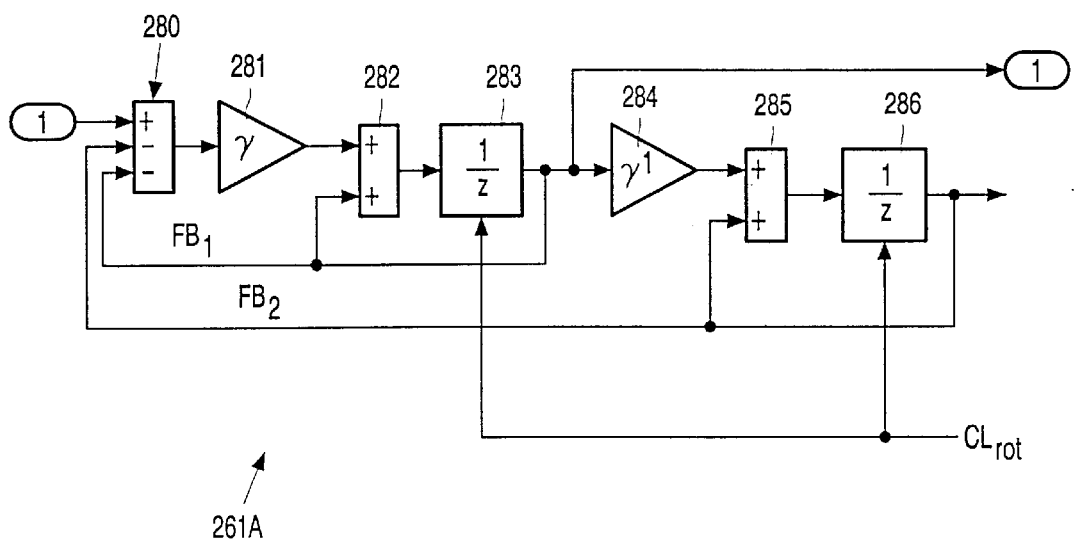
Figure 8:
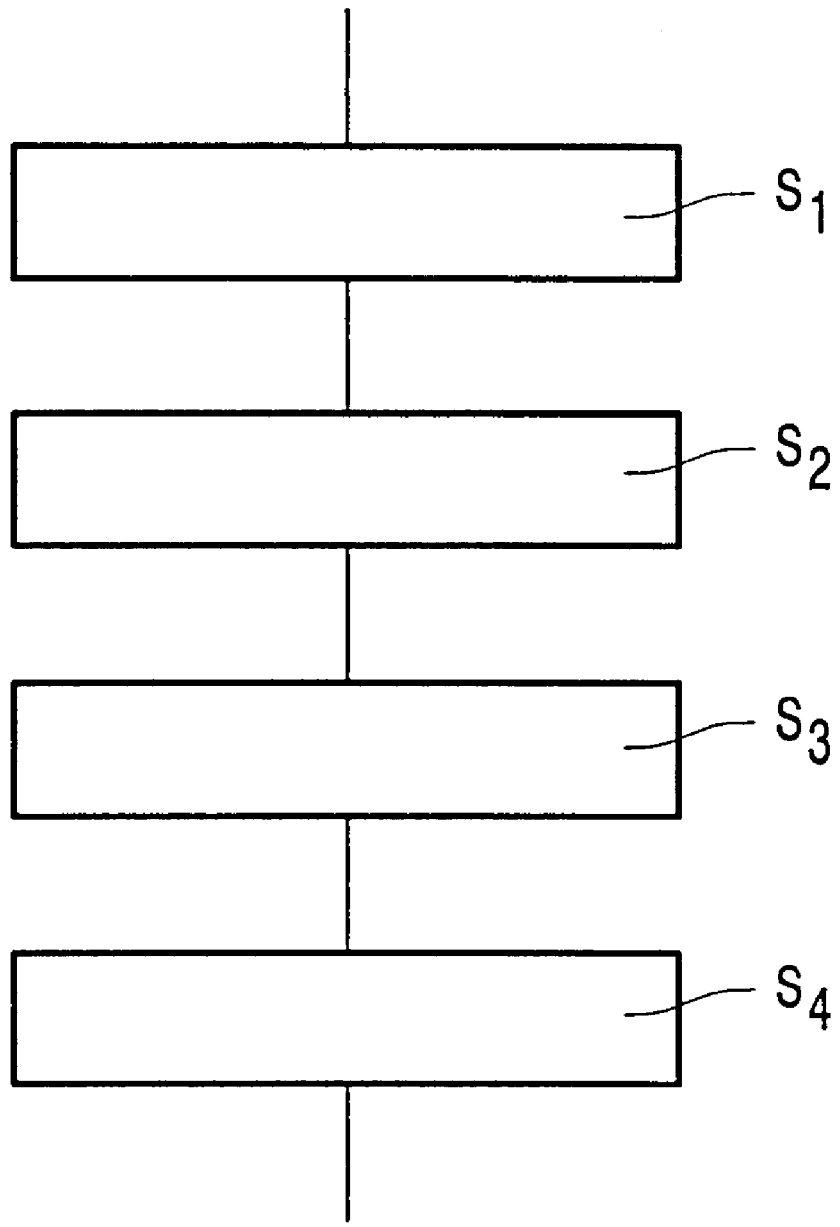
Figure 9:
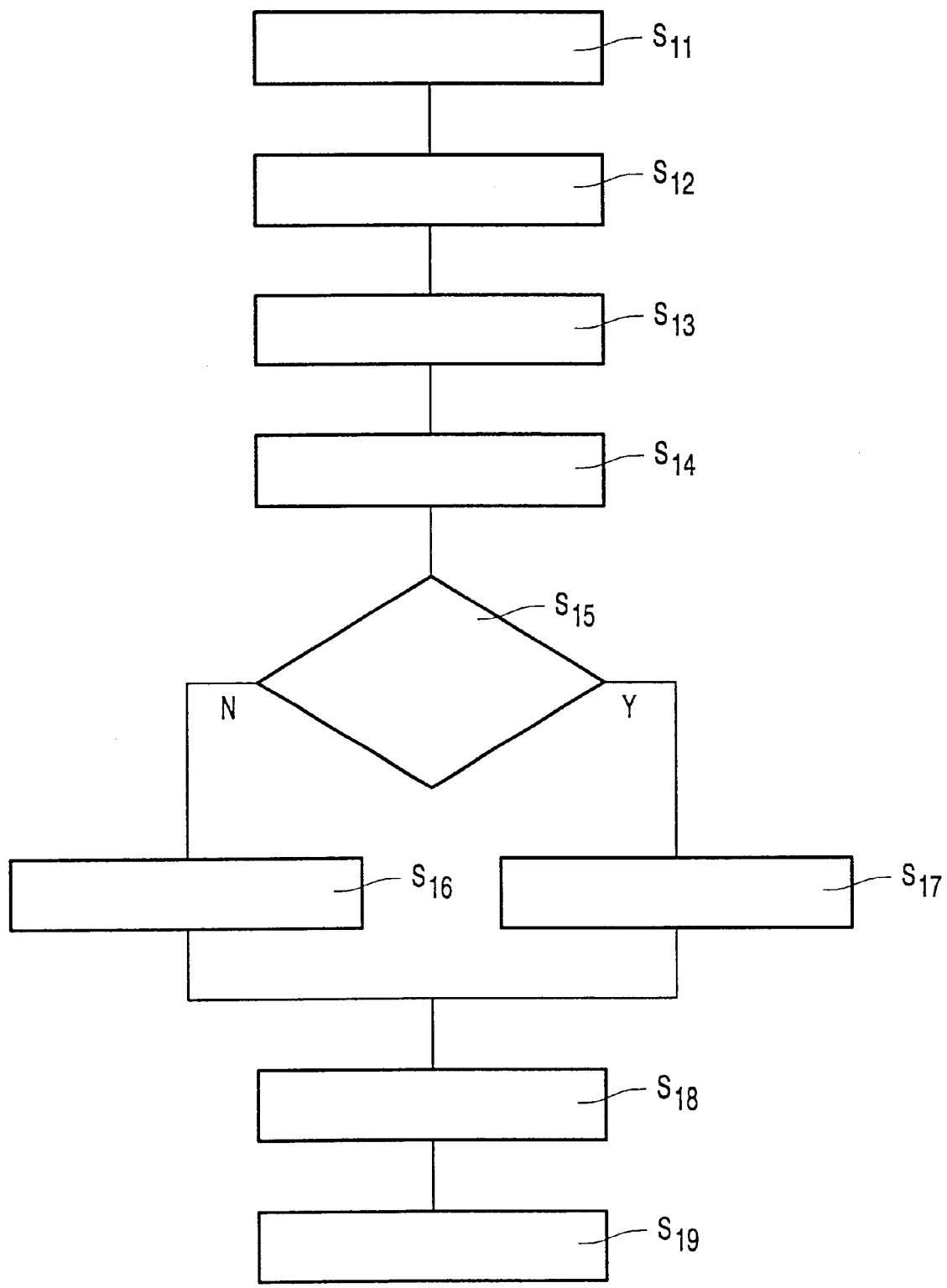

These and other aspects of the invention will be described in more detail with reference to the drawings. In the drawings:

FIGS. 1A through 1C diagrammatically show information carriers with errors of different types, FIG. 2 diagrammatically shows an embodiment of a device for recording and/or reproducing information on/from a rotary information carrier, FIG. 3 shows in more detail a part of the device shown in FIG. 2, FIG. 4 shows in further detail a portion of the part shown in FIG. 3, FIG. 5 shows in more detail a control circuit which forms part of the device of FIG. 2, FIG. 6 represents the open-loop gain of the control circuit shown in FIG. 5, FIG. 7 shows in more detail a part of the circuit shown in FIG. 5, FIG. 8 illustrates a first manner of implementing a method in accordance with the invention, FIG. 9 illustrates a second manner of implementing a method in accordance with the invention.

FIG. 2 shows a device for recording and/or reproducing information from/onto a rotary information carrier 10. The device has a motor 16 for rotary the information carrier. The device further has conversion means 20 for converting a write signal SW into a detectable pattern on the information carrier 10, or for generating a read signal $S_{LS}$ in response to a detectable pattern on the information carrier 10. In the present case, the read/write head 20 forms conversion means for these two functions. In one embodiment the information carrier is an optical information carrier and the read/write head is as shown in FIG. 3.

The read/write head shown in FIG. 3 includes imaging means, i.e. a lens 221, a beam splitter 222, and a focusing element 223 for imaging a radiation beam 224 so as to form a scanning spot 10a with which the information carrier 10 is scanned. The radiation beam is generated by means of a radiation source 220, such as a solid-state laser. The read means further include detection means 225, 226 for generating a read signal $S_{LS}$ which is indicative of the intensity of the radiation reflected from the information carrier 10 at the location of the scanning spot 10a. In the present case, the detection means are formed by an astigmatic element 224 and a four-quadrant detector 226, shown in greater detail in FIG. 4. The detector 226 supplies a read signal $S_{LS}$ composed of the signals D1, D2, D3, D4, which are each a measure of the intensity of the radiation incident on each of the four quadrants 226.1, 226.2, 226.3, 226.4 of the detector 226. A signal processing unit 21 derives an information signal $S_{inf}$, a radial error signal RE and a focus error signal FE from the read signal $S_{LS}$. The read/write head 20 further includes a first actuator 227A, 227B for axially positioning the focusing element 223 in response to a control signal $S_F$. The read/write head further includes a second actuator 228A, 228B for radially positioning the focusing element 223 in response to a further control signal $S_R$.

The device in accordance with the invention includes control means 25 for supplying the control signal $S_R$ to the conversion means in response to the radial error signal RE. The radial error signal can be generated in a manner known to one skilled in the art, for example by means of the push-pull method or the DPD method. The control means 25 further supply a control signal $S_{SL}$ to a slide motor 13 for radially positioning the read/write head 20. The present device further includes control means 26 for supplying the control signal $S_F$ to the conversion means in response to the focus error signal FE. The focus error signal FE can also be generated in a manner known per se, for example by means of the Foucault method or the astigmatic method.

The control means 25, 26 each further include detection means for generating a detection signal $D_R$, $D_F$ which is a measure of a periodic variation in the error signal RE, FE.

The shown device has a first mode in which information is written onto the information carrier 10. An information signal Si, which contains for example audio information, video information or other types of information, is encoded by encoding means 27, for example in accordance with the CIRC method. The encoded signal is further encoded by channel encoding means 28. A write strategy generator 28 generates a write signal SW from the signal thus encoded, to drive the radiation source 220 of the conversion means 20.

The device has a second mode in which information is read from the information carrier. In this mode the signal processing unit 21 generates an information signal Sinf from the read signal $S_{LS}$. This information signal is successively decoded by channel decoding means 23 and error correction decoding means 24.

The device in accordance with the invention is characterized by adjustment means 29 for influencing the response of the control means 25, 26 to the error signal RE, FE in dependence on the detection signal $D_R$, $D_F$.

The control means 26 for generating the axial control signal $S_F$ and the detection means 261 for generating the detection signal $D_F$ are shown in greater detail in FIG. 5. The control means 26 include a separating filter 262 for separating the error signal FE into a high-frequency component $FE_H$ and a low-frequency component $FE_L$. The control means 26 further include a first and a second controllable amplifier 263, 264 for amplifying the low-frequency component $FE_L$. The second controllable amplifier 264 has an output coupled to a first input of a first adder 265. The first adder 265 has a second input coupled to an output of a delay element 266. The first adder 265 has an output coupled to an input of the delay element 266. The second controllable amplifier 264, the first adder 265 and the delay element 266 together form an integrating element I. The first output 265 further has its output coupled to an input of a second adder 267 and an input of the detection means 261. The second adder 267 has a second input coupled to an output of the first controllable amplifier 263. The second adder 267 has an output coupled to a first input of a third adder 268. The third adder 268 has a second input coupled to a second output of the separating filter 261 to receive the high-frequency component $FE_H$ of the error signal. The third adder 268 has an output coupled to an input of a third controllable amplifier 270 via a low-pass filter 269. An output signal of the controllable amplifier 270 serves as the control signal $S_F$.

The open-loop gain $H(\omega)$ of the control means is represented diagrammatically in FIG. 6. In this Figure the gain H and the frequency $\omega$ are both represented logarithmically. The gain H decreases with a slope -1 down to a frequency $\omega_i$. The frequency $\omega_i$ can be controlled by means of the second controllable amplifier 264. The gain remains substantially constant in the interval $\omega_i$ to $\omega_d$. The frequency $\omega_d$ is controllable by means of the first controllable amplifier 263. In the interval from $\omega_d$ to $\omega_e$ the gain increases with a slope 1. The frequency $\omega_e$ is determined by the separating filter 262. Up to a frequency $\omega_n$ the gain remains substantially constant at a value K, after which the gain H decreases with a slope -1. The frequency $\omega_n$ is determined by the low-pass filter 269 and the gain K by the third controllable amplifier 270.

In the present embodiment the detection means 261 include a digital band-pass filter 261A, which is locked to the frequency of rotation $\omega$ of the information carrier 10, and a peak detector 261B.

The band-pass filter 261A is shown in greater detail in FIG. 7. The band-pass filter shown includes a fourth adder 280 for adding a first signal, in the present case the output signal of the integrator I, to a first and a second feedback signal $FB_1$, $FB_2$. The adder 280 has an output coupled to a multiplier 281, which multiplies the output signal of the adder by a factor $\gamma$, for example 1/32. The multiplier 281 has an output coupled to a first input of a fifth adder 282. An input of the fifth adder 282 receives the first feedback signal $FB_1$. The fifth adder has an output coupled to an input of a delay element 283. This delay element has an output coupled to a further multiplier 284 for multiplication by a factor $\gamma'$, for example also 1/32. The output of the delay element also supplies the first feedback signal $FB_1$. The further multiplier 284 has an output coupled to an input of a sixth adder 285. A further input of this sixth adder 285 receives the second feedback signal $FB_2$. The sixth adder 285 has an output coupled to an input of a further delay element 286. The output of this delay element 286 supplies the second feedback signal $FB_2$.

The control means 26 are also coupled to adjustment means via a bus CF. The gain of the controllable amplifiers 263, 264 and 270 as well as the frequency $\omega_e$ of the separating filter 262 are adjusted via the bus $C_F$. This enables the response of the control means 26 to the error signal FE to be adapted to the extent to which the information carrier 10 exhibits errors, such as eccentricity, unbalance and skew.

The control means 25 essentially correspond to the control means 26. However, the control means 25 also supply a control signal $S_{SL}$ for the slide motor 13, as is indicated by the dashed arrow in FIG. 5. The output signal of the integrator also serves as a control signal for the slide motor 13. Thus, it is achieved that the slide continually follows the actuator during tracking. However, this control signal $S_{SL}$ may also be derived in an alternative way, for example in such a way that the slide follows the excursion of the radial actuator in steps.

FIG. 8 illustrates a first manner of implementing the method in accordance with the invention. In a step S1 the information carrier is rotated. Subsequently, an error signal, such as the radial error signal RE, is generated in a step S2. Moreover, a detection signal $D_R$ is generated in the step S2, which signal is a measure of a periodic variation in the error signal. With the aid of the detection signal $D_R$ the response of the control means 25 to the error signal RE is adapted in a step S3. Subsequently, the information transfer from/to the information carrier 10 is effected in a step S4.

FIG. 9 illustrates a second manner of implementing the method in accordance with the invention. In this method the information carrier 10 is rotated with a first angular velocity in a step S11. In a step S12 the value of the detection signal at this angular velocity is determined. In a step S13 the information carrier is rotated with a second angular velocity. In a step S14 the value of the detection signal at this angular velocity is determined. In a step S15 it is determined whether or not the detection signal depends strongly on the angular velocity. If this is not the case, the angular velocity is set to a nominal value in a step S16. In the other case the angular velocity is set to a value below the nominal value in a step S17. In a step S18 the response of the control means 25 to the error signal is adapted with the aid of the detection signal DR. Subsequently, the information transfer from/to the information carrier 10 is effected in a step S19.

It is to be noted that means for the processing of signals mentioned in the present description, such as the control means, the adjustment means and the signal processing means, can be implemented in the form of software on a programmable processor or in the form of dedicated hardware.

What is claimed is:

1. A device for recording and/or reproducing information on/from a rotary information carrier, including means for rotating the information carrier, conversion means for the conversion of a write signal into a detectable pattern on the information carrier, or for generating a read signal in response to a detectable pattern on the information carrier, control means for supplying at least one control signal to the conversion means in response to an error signal, detection means for the generation of a detection signal which is a measure of a periodic variation in the error signal, characterized by adjustment means for influencing the response of the control means to the error signal in dependence on the detection signal.

2. A device as claimed in claim 1, characterized in that the adjustment means influence a bandwidth of the control means.

3. A device as claimed in claim 1, characterized in that the control means include a PID controller and the adjustment means influence one or more gain factors of the PID controller.

4. A device as claimed in claim 1, characterized in that the error signal is a radial error signal.

5. A device as claimed in claim 1, characterized in that the error signal is a focus error signal.

6. A device as claimed in claim 1, characterized in that the device further includes detection means for the generation of a further detection signal which is a measure of the influence of the angular velocity with which the information carrier is rotated on the detection signal, the device having the adjustment means also in order to influence the response of the control means to the error signal in dependence on the further detection signal.

7. A device as claimed in claim 6, characterized in that the filter is a digital band-pass filter having its sample frequency locked to the angular velocity of the information carrier.

8. A device as claimed in claim 1, characterized in that the detection means include a filter and a peak detector.

9. A device as claimed in any one of the preceding claims, characterized in that the adjustment means further influence the speed of rotation of the information carrier in response to the detection signal.

10. A method of recording and/or reproducing information on/from a rotary information carrier, comprising the steps of rotating the information carrier, converting a write signal into a detectable pattern on the information carrier, or generating a read signal in response to a detectable pattern on the information carrier, generating an error signal which is related to a parameter which influences the conversion, generating a control signal for optimizing the parameter in response to the error signal, generating a detection signal which is a measure of a periodic variation in the error signal, characterized by the response to the error signal being influenced in dependence on the detection signal.

11. A method as claimed in claim 10, further characterized by the information carrier being rotated with a first angular velocity and a second angular velocity which differ from one another, the detection signal being generated at the first and the second angular velocity, a further detection signal being generated, which further detection signal is a measure of the influence of the angular velocity on the detection signal, the response to the error signal being influenced in dependence on the further detection signal.

12. A method as claimed in claim 11, characterized in that the speed of rotation at which the information carrier is read or inscribed depends on the value of the further detection signal.

13. A method as claimed in claim 10, characterized in that the parameter is related to the radial error.

14. A method as claimed in claim 10, characterized in that the parameter is related to the axial error.

* * * * *